W. B. MAYFIELD.
CORN-HARVESTER.

No. 193,170.  Patented July 17, 1877.

WITNESSES:
Francis McArdle
J. H. Scarborough

INVENTOR:
W. B. Mayfield
BY
ATTORNEYS.

UNITED STATES PATENT OFFICE.

WASHINGTON B. MAYFIELD, OF SENECA, MISSOURI.

IMPROVEMENT IN CORN-HARVESTERS.

Specification forming part of Letters Patent No. 193,170, dated July 17, 1877; application filed June 4, 1877.

*To all whom it may concern:*

Figure 1:
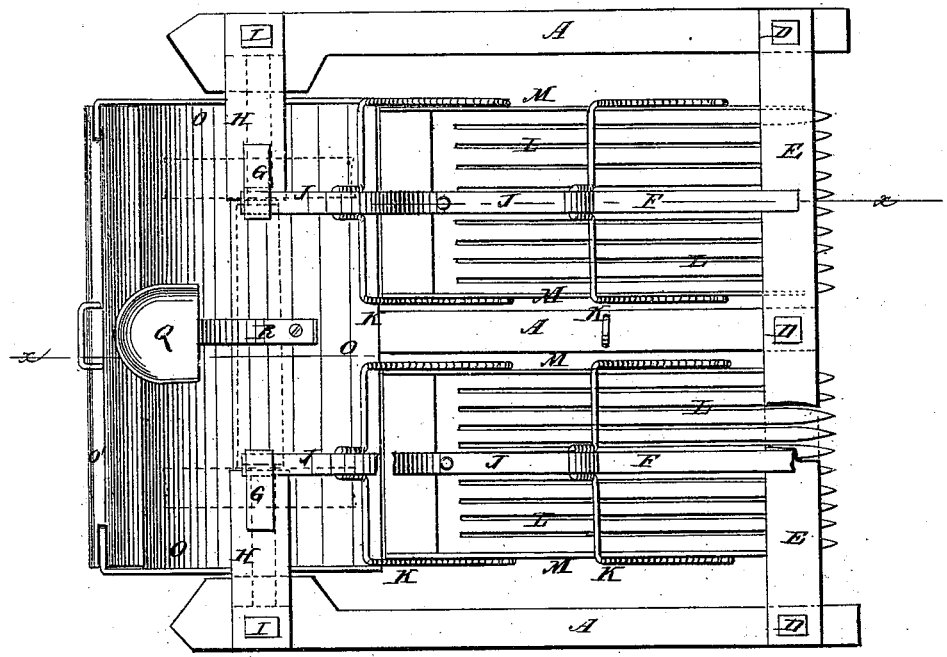
Figure 2:
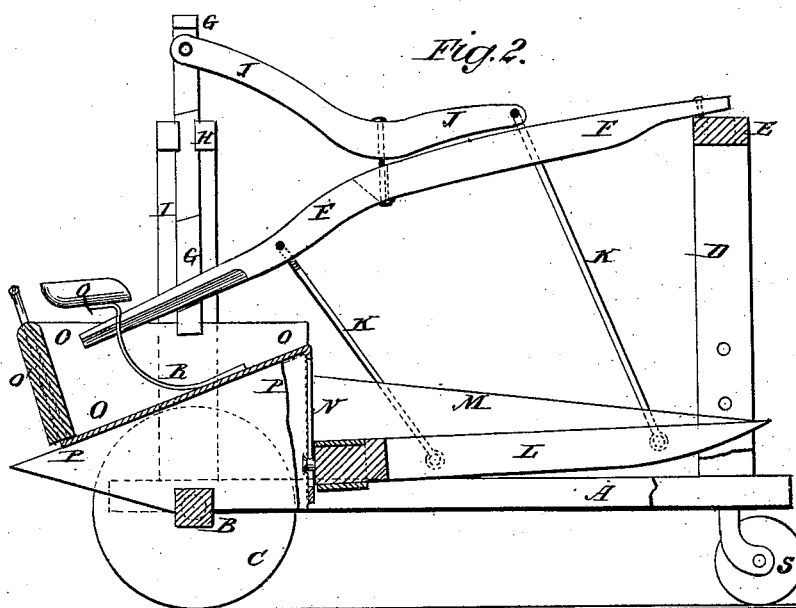

Be it known that I, WASHINGTON BENDER MAYFIELD, of Seneca, in the county of Newton and State of Missouri, have invented a new and useful Improvement in Corn-Harvesters, of which the following is a specification:

Figure 1 is a top view of my improved machine. Fig. 2 is a vertical section of the same, taken through the broken line $x\ x$, Fig. 1.

Similar letters of reference indicate corresponding parts.

The object of this invention is to furnish an improved machine for harvesting corn by stripping the ears from the stalks while standing in the field, and which shall be simple in construction, convenient in use, and effective in operation, doing its work rapidly and thoroughly.

The invention consists in the combination of the strippers, the bales, the levers, and the box, made with an inclined bottom, a vertical flange or apron, and a detachable back, with the wheels and axle and the frame-work of the machine, as hereinafter fully described.

A are three parallel bars or beams, the rear ends of which are attached to the center and the ends of the axle B. C are the wheels, which are made wide, and may have their faces concaved and corrugated, or left smooth, as may be desired. The wheels C revolve upon journals formed upon the axle B at the inner sides of the side bars A, which journals are made long, so that the wheels C may be adjusted wider apart or closer together, to correspond with the distance apart of the rows. The wheels C are designed to roll upon the rows, so as to roll upon and hold any stalks that may be pulled up by the machine. To the forward ends of the three bars or beams A are attached the lower ends of three posts, D, the upper ends of which are attached to, and connected by, a cross-bar, E. To the cross-bar E, midway between the posts D, are pivoted the forward ends of two levers, F, the rear ends of which rest in one or the other of the notches formed in the inner sides of the upright bars G. The bars G, at their middle parts, are attached to the inner ends of the short bars H, the outer ends of which are attached to the upper ends of the posts I, attached to the rear ends of the side bars A. The levers F are slightly curved or arched, and to their middle parts are pivoted the middle parts of two levers, J, which are curved in the opposite direction, and the rear ends of which are pivoted to the upper ends of the notched bars G. To the forward ends of the levers J, and to the rear parts of the levers F, are pivoted the middle parts of the bales K, the ends of which are pivoted to the opposite sides of the front and rear parts of the strippers.

The strippers are formed of a number of parallel fingers, L, placed about an inch and a half apart, and made about an inch and a half wide upon their upper sides. The fingers L are made thinner upon their lower sides, so that the stalks cannot wedge themselves while being drawn through. The ears, being thicker than the spaces between the fingers L, will be stripped from the stalks, and left upon the said fingers. The side fingers L are made larger and stronger than the others, and are further strengthened by the side-boards M, attached to them, and which keep the ears from falling off at the sides. The rear ends of the strippers L M move up and down along the vertical flange or apron N, hanging from the forward edge of the angular box or receiver O, the inclined bottom of which is attached to an inclined block or support, P, attached to the rear part of the middle bar A. The rear side $o'$ of the box O is made detachable, its ends being slotted to receive flanges formed upon the ends of the said box, or sliding between cleats attached to said sides. The strippers L M are made to move up and down vertically by guide-pins attached to their rear ends, and which pass through vertical slots in the apron or flange N. The strippers L M are hung with their forward ends inclined upward so much that when the said strippers are raised above the level of the forward side of the box O the ears will slide from them into the said box O. When a sufficient quantity of ears has been collected the sliding back $o'$ of the box O is raised, and the ears are allowed to slide out, and are left upon the ground in a heap.

Q is the driver's seat, the standard R of which is attached to the middle part of the inclined bottom of the box O, so that the driver may be in a convenient position for operating the levers F and the sliding back $o'$. The forward end of the machine is supported by a caster-wheel, S.

Having thus described my invention, I claim as new and desire to secure by Letters Patent—

The combination of the strippers L M, the bales K, the levers F J, and the box O, made with an inclined bottom, a vertical flange or apron, N, with the wheels and axle C B, and the frame-work of the machine, substantially as herein shown and described.

WASHINGTON B. MAYFIELD.

Witnesses:
  GEO. D. MORROW,
  P. I. RUSSELL.